Patented May 19, 1925.

1,538,414

UNITED STATES PATENT OFFICE.

RICHARD STÜSSER, OF DEUTZ, GERMANY, ASSIGNOR TO FARBENFABRIKEN VORM. FRIEDR. BAYER AND CO., OF LEVERKUSEN, NEAR COLOGNE-ON-THE-RHINE, GERMANY.

DIPHENYLDICARBOXYLIC ACID DISAZO DYES.

No Drawing.   Application filed November 13, 1922.   Serial No. 600,722.

*To all whom it may concern:*

Be it known that I, RICHARD STÜSSER, a citizen of Germany, residing at Deutz, near Cologne, Prussia, Germany, have invented new and useful Improvements in Diphenyldicarboxylic Acid Disazo Dyes, of which the following is a specification.

According to Patent No. 1,457,235 valuable cotton dyestuffs are obtained by combining one molecular proportion of the tetrazocompound of the 4.4′-diaminodiphenyl-3.3′-dicarboxylic acid having most probably the formula:

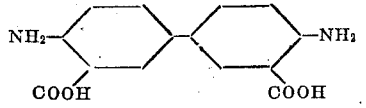

with one molecular proportion of each of two different azodyestuff components of which one contains sulfonic or carboxylic groups.

I have now found that one component may be a compound containing two hydroxyl or two amino groups, or one hydroxyl and one amino group, or a hydroxyl group in conjunction with another group which augments the solubility, for example the $CH_2$-CO group of the aceto-acetic-anilid or of the pyrazolon. Such components may be for example, resorcin, meta-phenylenediamine, meta-aminophenol, hydroxyphenyl-pyrazolon etc.

The alkali metal salts of my new dyestuffs, after being dried and pulverized, are yellow to brown to black powders soluble in water and in concentrated sulfuric acid generally with from a yellow to violet coloration. They yield by reduction with stannous chloride and hydrochloric acid 4.4′-diaminodiphenyl-3.3′-dicarboxylic acid, an aromatic amine and an aromatic amine containing at least one group augmenting the solubility. They dye cotton generally from yellow to orange to violet and brown shades which when aftertreated with copper salts generally change into deeper shades e. g. from red to violet, from orange to yellowish brown, etc. The aftertreated shades are distinguished for an excellent fastness to light and to washing.

In order to illustrate the new process more fully the following example is given, the parts being by weight:—272 parts of 4.4′-diaminodiphenyl-3.3′-dicarboxylic acid are tetrazotized in glacial acetic acid with 138 parts of sodium nitrite and 350 parts of hydrochloric acid 19½° Bé. To the resulting tetrazo solution 219 parts of N-Phenyl-beta-naphthylamine dissolved in glacial acetic acid is added. After the formation of the intermediate product is complete it is filtered off and stirred into a solution of 126 parts of resorcin in sodium carbonate. The tetrazo dye is salted out, filtered off and dried.

The resulting tetrazo dye, in the form of its sodium salt, after being dried and pulverized, is a black powder, soluble in water with a bluish-red and, in concentrated sulfuric acid with a violet coloration. It yields upon reduction with stannous chloride and hydrochloric acid 4.4′-diamino-diphenyl-3.3′-dicarboxylic acid, aminophenyl-aminonaphthalene and amino-resorcine. It dyes cotton blue-red shades which when aftertreated with copper sulfate change into reddish-violet shades fast to light and to washing.

The dye has most probably the following structural formula:

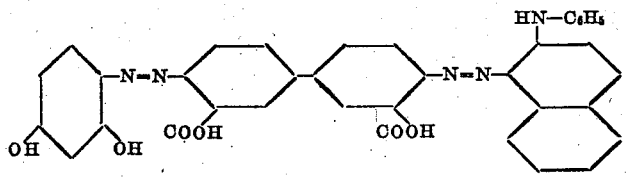

In the following table the shades of two other of my new dyestuffs are given:—

| Dyestuff obtained from 4.4'-diamino-diphenyl-3.3'-dicarboxylic acid combined with | Dyes cotton | After-treated with copper sulfate. |
|---|---|---|
| N-phenyl-2-naphthylamine and 1-ortho-hydroxyphenyl-3-methyl-5-pyrazolon | Bluish-red | Violet. |
| 1-meta-aminophenyl-3-methyl-5-pyrazolon and meta-aminophenol | Brownish-red | Brown. |

I claim:

1. The herein described new azodyestuffs, being derived from the 4,4'-diaminodiphenyl-3,-3'-dicarboxylic acid, having most probably the formula:

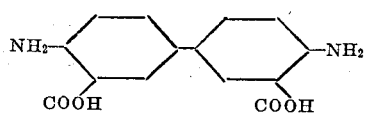

and one molecular proportion each of two different azodyestuff components, one and only one of which contains at least one group augmenting the solubility, the alkali metal salts of which dyestuffs, after being dried and pulverized, being yellow to brown to black powders soluble in water and in concentrated sulphuric acid generally with from a yellow to violet coloration; yielding by reduction with stannous chloride and hydrochloric acid 4,4'-diaminodiphenyl-3,3'-dicarboxylic acid, an aromatic amine, and also an aromatic amine containing at least one group augmenting the solubility; dyeing cotton generally from yellow to orange to violet to brown shades which by an after-treatment with copper salts generally change into deeper shades fast to light and to washing, substantially as described.

2. The herein described new azodyestuff, having most probably the structural formula:

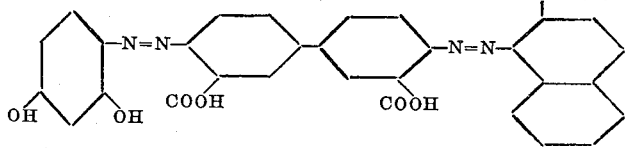

the sodium salt of which, after being dried and pulverized, is a black powder, soluble in water with a blue-red and in concentrated sulphuric acid with a violet coloration; yielding upon reduction with stannous chloride and hydrochloric acid 4,4'-diaminodiphenyl-3,3'-dicarboxylic acid, an amino-phenylaminonaphthalene and aminoresorcine; said dyestuff dyeing cotton blue-red shades which, by an after-treatment with copper sulphate, change into reddish-violet shades fast to light and to washing, substantially as described.

In testimony whereof I have hereunto set my hand.

RICHARD STÜSSER.